United States Patent
Nishikawa

(10) Patent No.: US 6,785,014 B1
(45) Date of Patent: Aug. 31, 2004

(54) FACSIMILE APPARATUS

(75) Inventor: Takatomi Nishikawa, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/395,152

(22) Filed: Sep. 14, 1999

(30) Foreign Application Priority Data

Oct. 2, 1998 (JP) .......................................... 10-280600

(51) Int. Cl.$^7$ ................................................ H04N 1/32
(52) U.S. Cl. ..................... 358/1.15; 358/3.06; 358/405; 358/426.02; 358/434
(58) Field of Search ................................ 358/1.15, 1.9, 358/2.1, 3, 3.01, 3.03, 3.06, 442, 444, 400, 405, 468, 426.02, 426.08, 426.16, 434

(56) References Cited

U.S. PATENT DOCUMENTS

| | | | | |
|---|---|---|---|---|
| 4,554,593 A | * | 11/1985 | Fox et al. .................... | 358/282 |
| 4,709,274 A | * | 11/1987 | Tanioka ...................... | 358/2.1 |
| 5,177,625 A | * | 1/1993 | Nakashima et al. ......... | 358/468 |
| 5,282,255 A | * | 1/1994 | Bovik et al. ................. | 382/239 |
| 5,502,576 A | * | 3/1996 | Ramsay et al. ............. | 358/444 |
| 5,701,366 A | * | 12/1997 | Ostromoukhov et al. ... | 382/237 |
| 5,710,829 A | * | 1/1998 | Chen et al. .................. | 382/173 |
| 5,825,937 A | * | 10/1998 | Ohuchi et al. .............. | 382/261 |
| 6,005,989 A | * | 12/1999 | Frederic ...................... | 382/300 |
| 6,289,137 B1 | * | 9/2001 | Sugiyama et al. .......... | 382/299 |

FOREIGN PATENT DOCUMENTS

| | | |
|---|---|---|
| JP | A8-204962 | 9/1996 |
| JP | 10-178494 A | 6/1998 |

\* cited by examiner

*Primary Examiner*—Edward Coles
*Assistant Examiner*—Joseph R. Pokrzywa
(74) *Attorney, Agent, or Firm*—Birch, Stewart, Kolasch & Birch, LLP

(57) ABSTRACT

There is provided a facsimile apparatus which transmits image data so that the image quality level of the received image can be kept in a range appropriate to the transmission signal rate without extending the transmission period of time in consideration of the data transmission rate varying with the communication conditions between transmitting and receiving facsimile apparatuses. A document is read by an image reading unit as an image having halftone densities so that the image of the document is converted into binary image data having different two or more gradients in a binary processing unit. A central processing unit conducts signal rate matching of the data transmission rate of the image data between the transmitting and receiving facsimile apparatuses through a communication line, line control unit and a modem. The binary data of the halftone image having an appropriate gradient is selected from the data which is generated by the binary processing unit depending upon the data transmitting rate of the image data which is determined by the phase matching (an arrangement of the binary pixels having a higher gradient is selected if the transmission rate is higher). The binary data having the selected gradient representing halftone image is transmitted to the transmitting facsimile apparatus.

4 Claims, 3 Drawing Sheets

FACSIMILE APPARATUS

BACKGROUND OF THE INVENTION

The present invention relates to a facsimile apparatus, and in particular to a facsimile apparatus which binary image processes the halftone read image data into different two or more gradients and is capable selecting and transmitting the image data having an appropriate gradient among binary image data which have been processed depending upon communication requirements including processing requirements at a receiving facsimile apparatus in consideration of the transmission period of time.

The facsimile apparatuses generally read the image of an original document by means of a reader and transmits the obtained image data to the other facsimile apparatuses over a transmission line.

Since the image data which is transmitted by the facsimile apparatus is binary data (1, 0) representing an monochrome image, it is necessary to process the read image into binary image data when the document has halftones. Various techniques for representing images by binary data including dithering technique and error diffusion technique have been proposed.

Although the dithering technique can shorten the period of time which is taken to transmit the image data, it provides a low image quality. Although the error diffusion technique can provide a high image quality, the period of time to transmit the image is extended. These techniques have advantages and disadvantages. A technique to address these problems is disclosed in Japanese Laid-open patent publication No. 8-204962.

This publication No. 8-204962 teaches that a scheme for processing halftone images so that they are represented by binary data is selected depending upon the recording line density of the facsimile apparatus which receives binary data.

FIG. 1 shows the flow of operation in the prior art apparatus. The operation of this apparatus will be described with reference to the drawing.

Facsimile transmission is generally conducted by receiving and detecting a digital identification signal (DIS signal) including information of the receiving capability at the receiving terminal and then transmitting a digital command signal (CDS signal) and a training signal for the purpose of phase matching of the signal rates of the image data, prior to the transmission of the binary image data to the receiving facsimile apparatus. If it is judged that the signal rate is such that the reception of the image data is possible, a facsimile apparatus at the receiving terminal which received the training signal responds the training signal with a responding signal (CFR signal) for confirming the ready state of the reception. If it is otherwise judged, the receiving facsimile apparatus responds the training signal with a training failure responding signal (FTT signal). If the transmitting (sending) facsimile apparatus receives the FTT signal, the data signal rate is lowered to a next lower rate at which the receiving facsimile apparatus can accept the data signal and the signal rate of the image data is determined by retransmitting the training signal for phase matching.

Also in the prior art, after passing the above-mentioned general procedure, it is judged whether or not the transmission mode specifies the halftone image. If the halftone image is specified, a scheme is selected to process the image so that the halftone image is represented by binary data for shortening the communication period of time.

In this art, if the recording line density of the receiving facsimile apparatus, which is detected from the DIS signal is 400 dpi, the read image data is binary processed by the error diffusion technique having a resolution of 400 dpi and is transmitted. If the recording line density is other than 400 dpi, the read image data is binary processed by the dithering technique having a resolution of 200 dpi and is transmitted. The prior art adopts a basic concept for selecting among halftone binary image processing techniques such as error diffusion and dithering techniques.

However, the technique which is disclosed in the above-mentioned Japanese Laid-open patent publication No. 8-204962 has a problem as follows: If the above-mentioned scheme for binary processing the halftone image is selected, the signal rate may often be lowered due to phase matching between the transmitting and receiving facsimile apparatuses while the recording line density of the receiving apparatus can be recognized from the normally received DIS signal, in case of overseas communications in which the signal level is generally deteriorated or in which the quality of the transmission line is not excellent.

Since the scheme of binary processing of the halftone image is selected based upon the information of the receiving capability (recording line density) of the receiving facsimile apparatus by the technique of the Japanese Laid-open patent publication No. 8-204962 in such a case, if the binary image processing for higher image quality is selected by detecting the DIS signal which is transmitted from the receiving facsimile apparatus, the data transmission rate may be lowered due to the phase matching, resulting in an extension of the transmission period of time.

SUMMARY OF THE INVENTION

It is an object of the present invention to provide a facsimile apparatus for transmitting image data, which is capable of keeping the image quality of the received image in a range which is proper to the transmission rate without extending the transmission period of time in consideration of the data transmission rate which is varied depending upon the communication conditions including the conditions of the transmission line between the transmitting and receiving facsimile apparatuses and the processing conditions at the receiving facsimile apparatus.

It is another object of the present invention to provide a facsimile apparatus which is capable of shortening the transmission time without extending thereof even if the data signal rate is lowered by optically reading the image of a document to convert the image data which is output as halftone image data into binary halftone image data in which binary pixels are differently arranged depending upon the gradient of the document, and by selecting an appropriate gradient among the resultant binary data representing two or more different halftone images depending upon the transmission rate of the signal which is determined by the phase matching of the data signal rate between the transmitting and receiving facsimile apparatuses.

The facsimile apparatus of the present invention comprises an image reading unit for reading the image of an original document, a binary processing unit for generating binary image data having different two or more gradients representing halftone images, a modem and line control unit for conducting communications between transmitting and receiving facsimile apparatuses over a communication line, and a central processing unit for outputting the binary image data as transmission data to the modem by selecting the gradient depending upon the signal rate which is determined by the phase matching the transmission data rates between the transmitting and receiving apparatuses. When the image of the halftone document is transmitted, the facsimile apparatus of the present invention conducts the phase matching of the data signal rates of the image data between this transmitting and the receiving facsimile apparatuses by the central processing unit via the transmission line, the line control unit and the modem and the central processing unit selects binary data representing halftone image which is generated by the halftone image binary processing method having an appropriate gradient based upon the data signal rate of the image data which is determined by the phase matching. The binary data of the halftone image is provided by reading the document as the image having a halftone density by means of the reading unit and by converting the read image data into binary data in accordance with a halftone image binary processing method by means of the halftone image binary data processing unit. The binary data which is output from the halftone image binary data processing unit is transmitted to the receiving facsimile via the modem, line control unit and transmission line.

It is a further object of the present invention to provide a facsimile apparatus, in that the apparatus comprises a central processing unit for controlling the whole of the facsimile apparatus, an image reading unit which is capable of optically reading an image of an original document to be transmitted to output the read image as data representing halftone images, a halftone image binary processing unit for converting the image data representing halftone images, which is output from the reading unit into binary image data, having different two or more gradients, in which the binary pixels are differently arranged depending upon a gradient, a modem for conducting modulation and demodulation between binary image data including the image data from the halftone image binary processing unit and a transmission signal which is transmitting over a communication line, and a line control unit for controlling the communication line on which transmitting facsimile apparatus communicates to receiving facsimile apparatus, wherein the gradient is selected from the binary image data which is generated by the halftone image binary processing unit depending upon the data transmission rate which is determined by phase matching between the transmitting facsimile apparatus which transmits the binary image data and the receiving facsimile apparatus which receives the transmitted binary image data and wherein the obtained data is used as a transmission signal.

It is a further object of the present invention to provide a facsimile apparatus in that higher and lower image quality data is selected among the binary image data having different two or more gradients, which is generated by the halftone image binary processing unit if the data transmission rate which is determined by phase matching between the transmitting and receiving facsimile apparatuses is higher and lower, respectively.

It is a further object of the present invention to provide a facsimile apparatus in which the binary image data which is generated by said binary processing unit for the halftone image is reselected in accordance with the image quality of the receiving facsimile apparatus if the receiving facsimile apparatus which receives the binary image data has a lower image quality than that is selected depending upon said data transmission rate.

PREFERRED EMBODIMENT OF THE INVENTION

A preferred embodiment of the facsimile apparatus of the present invention will now be described with reference to the drawings.

Figure 1:
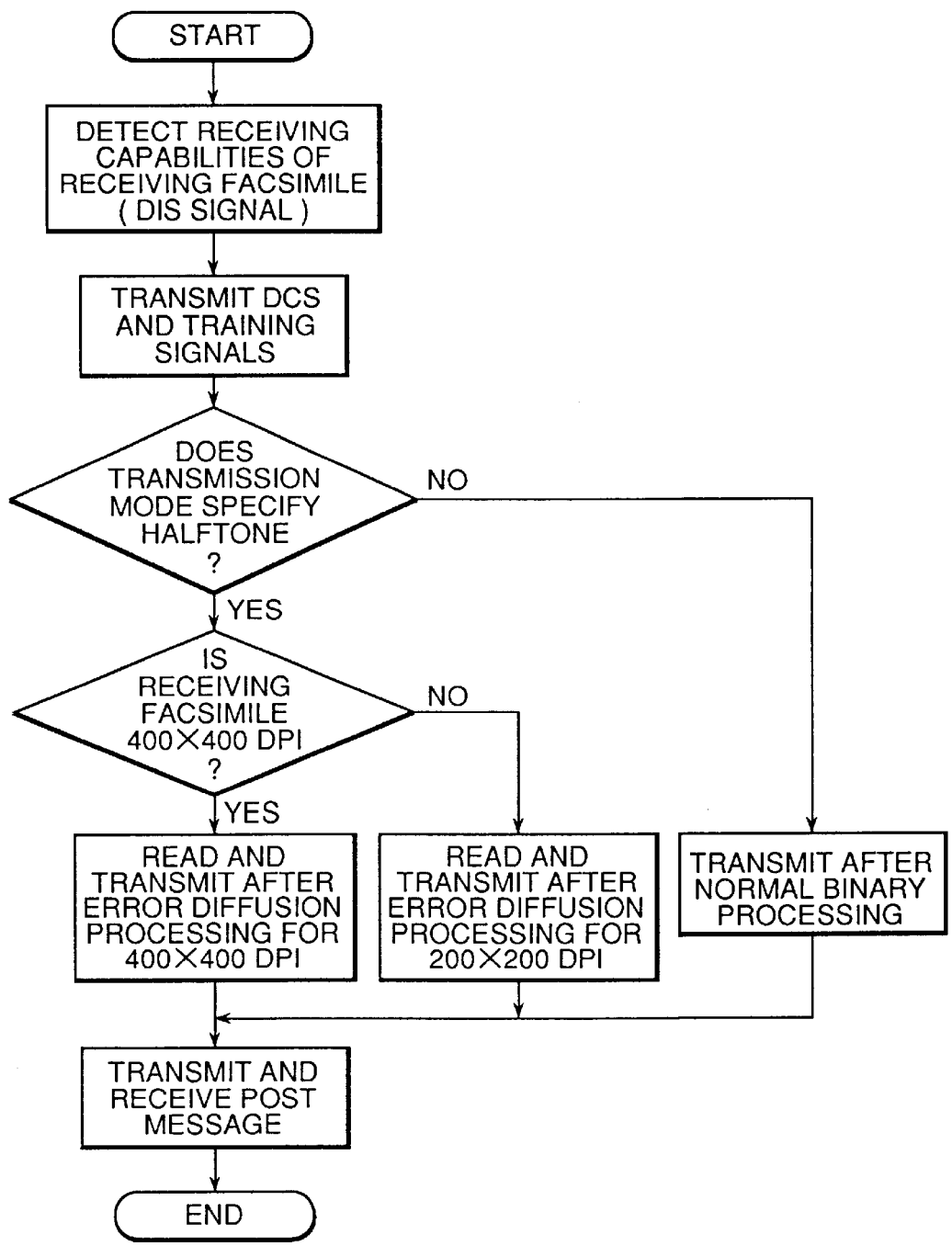
FIG. 1 is a flow chart showing the steps of the operation in a prior art facsimile apparatus.
Figure 2:
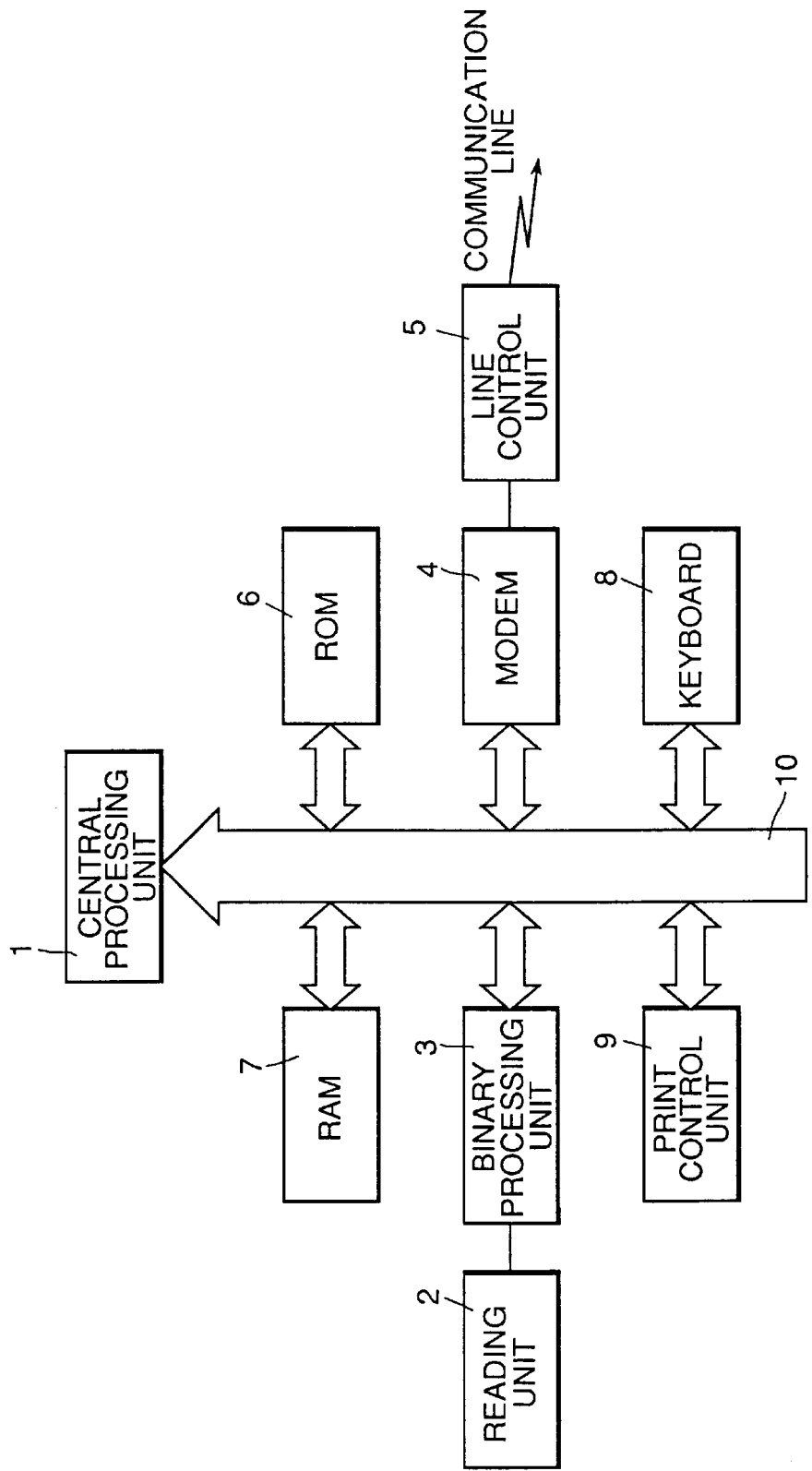
FIG. 2 is a block diagram showing the whole structure of one embodiment of a facsimile apparatus of the present invention.

FIG. 2 is a block diagram showing the exemplary configuration of the facsimile apparatus of the present invention.

The facsimile apparatus which is shown in FIG. 2 comprises a central processing unit 1 for controlling the whole of the facsimile apparatus, an image reading unit 2 which is capable of optically reading the image of an original document to be transmitted to output the read image as image data representing a halftone image, a binary processing unit 3 for converting the image data having halftone density which is output from the reading unit 2 into binary image data (1,0) representing black and white levels, said binary processing unit 3 being capable of generating the image having two or more gradients by combination of the arrangements of black and white pixels, a modem 4 for conducting the modulation and demodulation between the binary image data to be transmitted and a transmission signal which is transmitted over a communication line, a line control unit 5 for controlling the communication line, a ROM 6 storing therein programs and data which are necessary for the processing by the central processing unit 1, a RAM 7 for temporarily storing information of the receiving apparatus on communication therewith or information of the transmission rate of the data signal, a keyboard 8 by which a user enters commands such as transmission command and designation of halftone mode into the apparatus, and a print control unit 9 for printing the image data on a thermally sensitive paper and the like when the printing of the received image or reproduction of the original document is conducted. The above-mentioned components are connected with the central processing unit 1 via a bus line 10.

Figure 3:
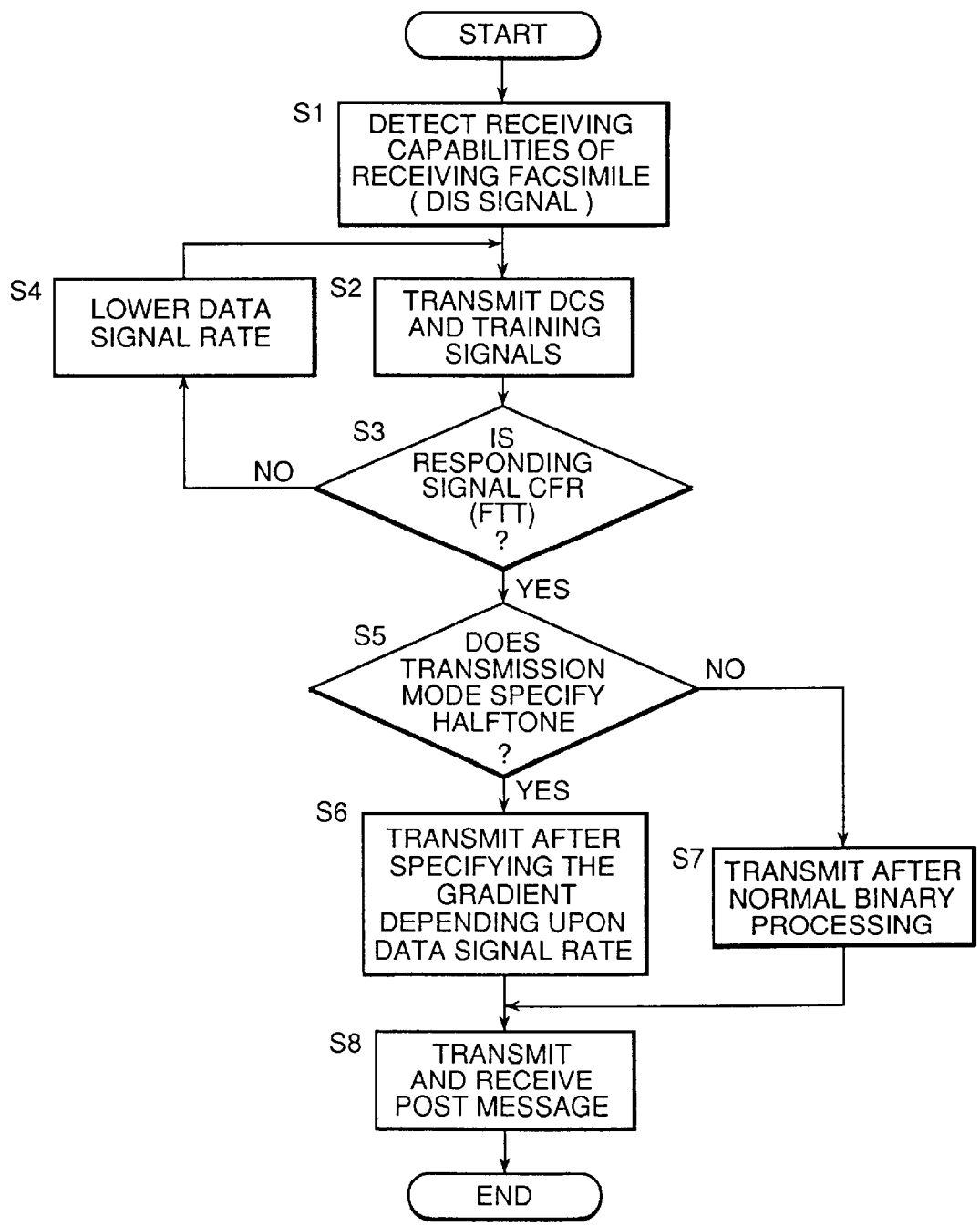
FIG. 3 is a flow chart showing the steps of the operation in one embodiment of the facsimile apparatus of the present invention.

The configuration and the operation of the facsimile apparatus in this embodiment will be described in detail with reference to the flow chart of FIG. 3 showing the flow chart for controlling the operation of the facsimile apparatus of the present invention.

When the operation of the apparatus is initiated by the user's manipulation of the keyboard 8 for entering a command to initiate the transmission of the document to be transmitted as image data having halftone densities into the transmitting facsimile apparatus, the central processing unit 1 accepts a signal on the transmission line via the line control unit 5 and the modem 4, so that a digital identification signal (DIS signal) including information (receiving capabilities) of the receiving facsimile apparatus is detected (step S1).

Thereafter, a digital command signal (DCS signal) and a training signal for the purpose of phase matching of the signal rate of the image data are transmitted (step S2).

If the receiving facsimile apparatus judges by receiving the training signal that the transmitted signal has such a signal rate that the image data can be received, it transmits a responding signal (CFR signal) for confirming the reception ready state to the transmitting facsimile apparatus.

Alternatively, if the receiving facsimile apparatus judges that the reception of the image data is impossible due to the low signal level on the transmission line or the deteriorated quality of the signal which is caused by the noise on the line, it transmits a training failure responding signal (FTT signal) to the transmitting facsimile apparatus.

The central processing unit 1 judges whether the signal from the receiving apparatus in response to the transmitting the DCS signal and the training signal is the CFR signal or the FTT signal (step S3). It judges that the FTT signal is detected or that the CFR signal can not be detected, it presets the transmission signal rate which is not higher than the data signal rate of the transmitted training signal (step S4). The central processing unit 1 repeats the above-mentioned processing until the phase matching is successful by conducting again the previous step S2 for transmitting the DCS signal and the training signal in accordance with the presetting.

If the central processing unit 1 judges that the phase matching has been successful, i.e., that the CFR signal was received as the responding signal from the receiving facsimile apparatus (remote apparatus) 9 at step S3 after passing the above-mentioned steps, it judges whether or not the command by means of the keyboard 8 which is the manipulation means specifies the transmission mode for halftone image processing (step S5).

As a result, if the transmission mode for the halftone processing is not specified, the central processing unit 1 instructs the binary processing unit 3 to conduct normal binary processing of the image data which has been read by the reading unit 2 to output the binary image data to the modem 4 as transmission data so that the image data will be transmitted to the receiving apparatus over the transmission line under the control of the line control unit 5 (step S7).

On the other hand, if the transmission mode for the halftone image processing is specified at step S5, the central processing unit 1 instructs that the maximum gradient is selected as a gradient for the halftone processing based upon the data signal rate (data transmission rate) which is determined depending upon the DCS signal and the training signal on completion of the phase matching between the transmitting and receiving facsimile apparatuses and that the image data representing halftone image which has been read by the reading unit 2 is converted into binary data in the binary processing unit 3 by selecting a scheme for arranging black and white pixels based upon the selected gradient (that is an image comprising binary (black and white) pixels is produced by an arranging scheme which is different depending upon the differences in the gradients so that the amount of information is less as the gradient decreases, resulting in a shortened period of time which is taken to transmit). The binary image data is output to the modem 4 as transmission data and then is transmitted to the receiving facsimile apparatus over the communication line under control of the line control unit 5 (step S6).

In other words, in the transmission mode for halftone processing, an scheme of the arrangement of the binary pixels to provide a high quality image is selected if the data signal rate which has been determined by the phase matching is higher. A scheme of the arrangement of binary pixels to provide such an tone enabling the shortening of the transmission time is selected although a lower image quality is provided if the signal rate is lower. In such a manner, extension of the transmission time can be prevented although the signal rate is lower by achieving the shortening of the transmission time which is taken in the prior art in which the data signal rate is lower.

Returning to the flow chart of the operation of the exemplary facsimile apparatus, after all transmission of the binary data of either black and white levels or halftone densities is completed at the above-mentioned steps S7 and S6, a post message is transmitted and received between the transmitting and receiving apparatuses (step S8) and the transmission is completed.

The present invention which has been described provides the advantages as follows:

When the halftone image of a document is transmitted by the inventive facsimile apparatus, an appropriate maximum gradient is selected for the halftone image processing depending upon the transmission rate of the data signal which has been determined by the phase matching between the transmitting and receiving facsimile apparatuses and the image data representing a halftone image, which has been read by the reading unit is converted into binary data in the binary processing unit by selecting among arranging schemes of black and white pixels based upon the selected gradient. Specifically, a high quality halftone image processing is at a selected higher signal rate and a halftone processing method is automatically selected by giving priority to shortening of the transmission time at a lower signal rate.

Therefore, facsimile transmission can be achieved which is capable of shortening of the communication time even if the rate of data signal is lowered due to deterioration of communication conditions such as lowering of quality of the transmission line or the signal level on overseas communications.

What is claimed is:

1. A facsimile apparatus, wherein the apparatus comprises a central processing unit for controlling the whole of the facsimile apparatus, an image reading unit which is capable of optically reading an image of an original document to be transmitted to output the read image as data representing halftone images, a halftone image binary processing unit for converting the image data representing halftone images, which is output from the image reading unit into binary image data, having two or more gradients, in which binary pixels are differently arranged depending upon a gradient, a modem for conducting modulation and demodulation between binary image data including the image data from the halftone image binary processing unit and a transmission signal which is transmitting over a communication line, and a line control unit for controlling the communication line on which transmitting facsimile apparatus communicates with receiving facsimile apparatus, wherein the gradient is selected depending upon data transmission rate which is determined by phase matching between the transmitting facsimile apparatus which transmits the binary image data and the receiving facsimile apparatus which receives the transmitted binary image data and the binary image data is generated by the halftone image binary processing unit based upon the selected gradient and wherein the obtained data is used as a transmission signal.

2. A facsimile apparatus as defined in claim 1, wherein higher and lower image quality data is selected among the binary image data having different two or more gradients, wherein the image data is generated by the halftone image binary processing unit if the data transmission rate which is determined by phase matching between the transmitting and receiving facsimile apparatuses is higher and lower, respectively.

3. A facsimile apparatus as defined in claim 1 wherein the binary image data which is generated by the halftone image binary processing unit is reselected in accordance with the image quality of the receiving facsimile apparatus, if the receiving facsimile apparatus which receives the binary image data has a lower image quality than that is selected depending upon the data transmission rate.

4. A facsimile apparatus as defined in claim 2, wherein the binary image data which is generated by the halftone image binary processing unit is reselected in accordance with the image quality of the receiving facsimile apparatus, if the receiving facsimile apparatus which receives the binary image data has a lower image quality than that is selected depending upon the data transmission rate.

* * * * *